United States Patent
Aikawa et al.

(10) Patent No.: US 6,683,956 B1
(45) Date of Patent: Jan. 27, 2004

(54) ENCRYPTING CONVERSION APPARATUS, DECRYPTING CONVERSION APPARATUS, CRYPTOGRAPHIC COMMUNICATION SYSTEM, AND ELECTRONIC TOLL COLLECTION APPARATUS

(75) Inventors: Makoto Aikawa, Yokohama (JP); Shigeru Hirahata, Kanagawa-ken (JP); Kazuo Takaragi, Ebina (JP); Yoshimichi Kudo, Fujisawa (JP)

(73) Assignee: Hitachi, Ltd., Tokyo (JP)

( * ) Notice: Subject to any disclaimer, the term of this patent is extended or adjusted under 35 U.S.C. 154(b) by 0 days.

(21) Appl. No.: 09/323,252

(22) Filed: Jun. 1, 1999

(30) Foreign Application Priority Data

May 29, 1998 (JP) .......................... 10-148712

(51) Int. Cl.[7] ................................ H04L 9/06
(52) U.S. Cl. ................................ 380/37; 380/42
(58) Field of Search .................. 380/42, 28, 37, 380/29, 284; 713/168

(56) References Cited

U.S. PATENT DOCUMENTS

| | | | | |
|---|---|---|---|---|
| 4,850,019 A | * | 7/1989 | Shimizu et al. | 380/29 |
| 4,926,479 A | * | 5/1990 | Goldwasser et al. | 713/180 |
| 5,103,479 A | * | 4/1992 | Takaragi et al. | 380/28 |
| 5,193,115 A | * | 3/1993 | Vobach | 380/46 |
| 5,270,956 A | * | 12/1993 | Oruc et al. | 708/491 |
| 5,742,678 A | * | 4/1998 | Dent et al. | 380/270 |

* cited by examiner

*Primary Examiner*—Gilberto Barrón
*Assistant Examiner*—Kambiz Zand
(74) *Attorney, Agent, or Firm*—Antonelli, Terry, Stout & Kraus, LLP

(57) ABSTRACT

An encrypting conversion apparatus, a decrypting conversion apparatus, a cryptographic communication system and an electronic toll collection apparatus are provided which are capable of changing algorithms of cryptographic conversion to hide the algorithm in use from a third party so that the apparatuses and system are resistant against a cryptographic attack from the third party and can operate at high speed. In the cryptographic communication system.

2 Claims, 11 Drawing Sheets

ENCRYPTING CONVERSION APPARATUS, DECRYPTING CONVERSION APPARATUS, CRYPTOGRAPHIC COMMUNICATION SYSTEM, AND ELECTRONIC TOLL COLLECTION APPARATUS

CROSS-REFERENCE TO RELATED APPLICATION

This application relates to an application U.S. Ser. No. 09/130,529 filed on Aug. 4, 1998 by Makoto Aikawa et al entitled "DATA ENCRYPTING/DECRYPTING CONVERSION METHODS AND APPARATUSES AND DATA COMMUNICATION SYSTEM ADOPTING THE SAME" and assigned to the present assignee. The disclosure of that application is hereby incorporated by reference into the disclosure of this application.

BACKGROUND OF THE INVENTION

1. Field of the Invention

The present invention relates to techniques for encrypting/decrypting digital data transferred among computers, household information processing appliances, and electronic toll collection apparatuses.

2. Description of the Related Art

Enciphering techniques for preventing an illegal copy of digital data are essential for digital household information processing appliances. For example, if digital visual data received by a digital broadcasting receiver is digitally recorded in a digital video recorder and the digital visual data has a copyright, both the receiver and digital video recorder are required to have a function of protecting the copyright. In order to realize such a copyright protection system, it is necessary to prevent alteration and illegal copying of digital data by means of setting a limitation to digital data copying, device authentication, and cryptographic techniques such as real time cryptograph of digital data.

An example of conventional cryptographic techniques may be a symmetric key or common key algorithm, typically DES cryptograph disclosed in U.S. Pat. No. 3,962,539. Most of common key algorithms are characterized in a complicated cryptogram formed by repeating a simple conversion. Various approaches have been tried in order to improve security of cryptograms. For example, a cryptographic attack can be made difficult by increasing the number of repetitions of simple conversions to further disturb statistical characteristics of cipher texts.

However, if the number of conversion repetitions is increased, the processing time required for cryptographic conversion becomes long. Therefore, a security reinforcing countermeasure through an increase in the number of repetitions of simple conversions is not suitable for real time cryptograph in the copyright protection system.

In an electronic toll collection system (ETC) of a toll speed-way which has lately attracted attention, a real-time cryptographic processing is required, so that the problem as mentioned above arises.

The electronic toll collection system represents a system which is capable of collecting a toll based on an electronic transaction through a wireless communication between an antenna provided at a toll collecting station and an on-board equipment mounted on a car when the car passes through the toll collecting station, the details of which are described in for example, a Japanese magazine "Card Wave" published by C-Media, March, 1999, pp42–45. In the referred-to system, a real-time cryptographic processing is indispensable in order to send and receive exchange data at real time and protect the exchange data from bugging and unauthorized alteration.

SUMMARY OF THE INVENTION

It is an object of the present invention to provide an encrypting conversion apparatus, a decrypting conversion apparatus, a cryptographic communication system and an electronic toll collection apparatus capable of changing algorithms of cryptographic conversion to hide the algorithm in use from a third party so that the apparatuses and system are resistant against a cryptographic attack and can operate at high speed.

According to one aspect of the present invention, there is provided an encrypting conversion apparatus for inputting at least one cipher key, at least one algorithm parameter, and plain text data and outputting cipher text data, the apparatus comprising: a plurality stage of encrypting conversion means for executing each of an exclusive logical sum operation, a cyclic shift operation and an addition operation at least once, wherein: the encrypting conversion means includes at least one of each of first to third operation means, the first operation means executes either an exclusive logical sum operation or an addition operation of input data and a portion of data generated from data of the cipher key, the second operation means executes either an exclusive logical sum operation or an addition operation of input data and a portion of data determined by the algorithm parameter, and the third operation means cyclically shifts input data by the number of bits determined by the algorithm parameter; and conversions which use combinations of a plurality stage of consecutive encrypting conversion means optionally selected from all of the encrypting conversion means and use the same input data and the same algorithm parameter, are all different.

According to another aspect of the present invention, there is provided a decrypting conversion apparatus for inputting at least one cipher key, at least one algorithm parameter, and cipher text data and outputting plain text data, the apparatus comprising: a plurality stage of decrypting conversion means for executing each of an exclusive logical sum operation, a cyclic shift operation and an addition operation at least once, wherein: the decrypting conversion means includes at least one of each of first to third operation means, the first operation means executes either an exclusive logical sum operation or an addition operation of input data and a portion of data generated from data of the cipher key, the second operation means executes either an exclusive logical sum operation or an addition operation of input data and a portion of data determined by the algorithm parameter, and the third operation means cyclically shifts input data by the number of bits determined by the algorithm parameter; and conversions which use combinations of a plurality stage of consecutive decrypting conversion means optionally selected from all of the encrypting conversion means and use the same input data and the same algorithm parameter, are all different.

According to another aspect of the present invention, there is provided a cryptographic communication system with a common key algorithm for communication between a transmitter apparatus and a receiver apparatus having a same cipher key, the transmitter apparatus encrypting a plain text by using the cipher key to acquire and transmit a cipher text, and the receiving apparatus decrypting the received cipher text by using the cipher key to recover the plain text, wherein: the transmitter apparatus includes encrypting conversion means and first algorithm key storing means; the receiver apparatus includes decrypting conversion means and second algorithm key storing mean; a conversion algorithm to be executed by the encrypting conversion means of the transmitter apparatus is determined by a first parameter stored in the first algorithm key storing means of the transmitter apparatus; a conversion algorithm to be executed by the decrypting conversion means of the receiver apparatus is determined by a second parameter stored in the second algorithm key storing means of the receiver apparatus; and the cipher text encrypted by the transmitter apparatus by using the cipher key can be correctly decrypted by the receiver apparatus by using the cipher key, only if the cipher key as well as the first and second parameters used by the transmitter and receiver apparatuses is same.

DETAILED DESCRIPTION OF THE EMBODIMENTS

Embodiments of the invention will be described with reference to the accompanying drawings.

Figure 1:
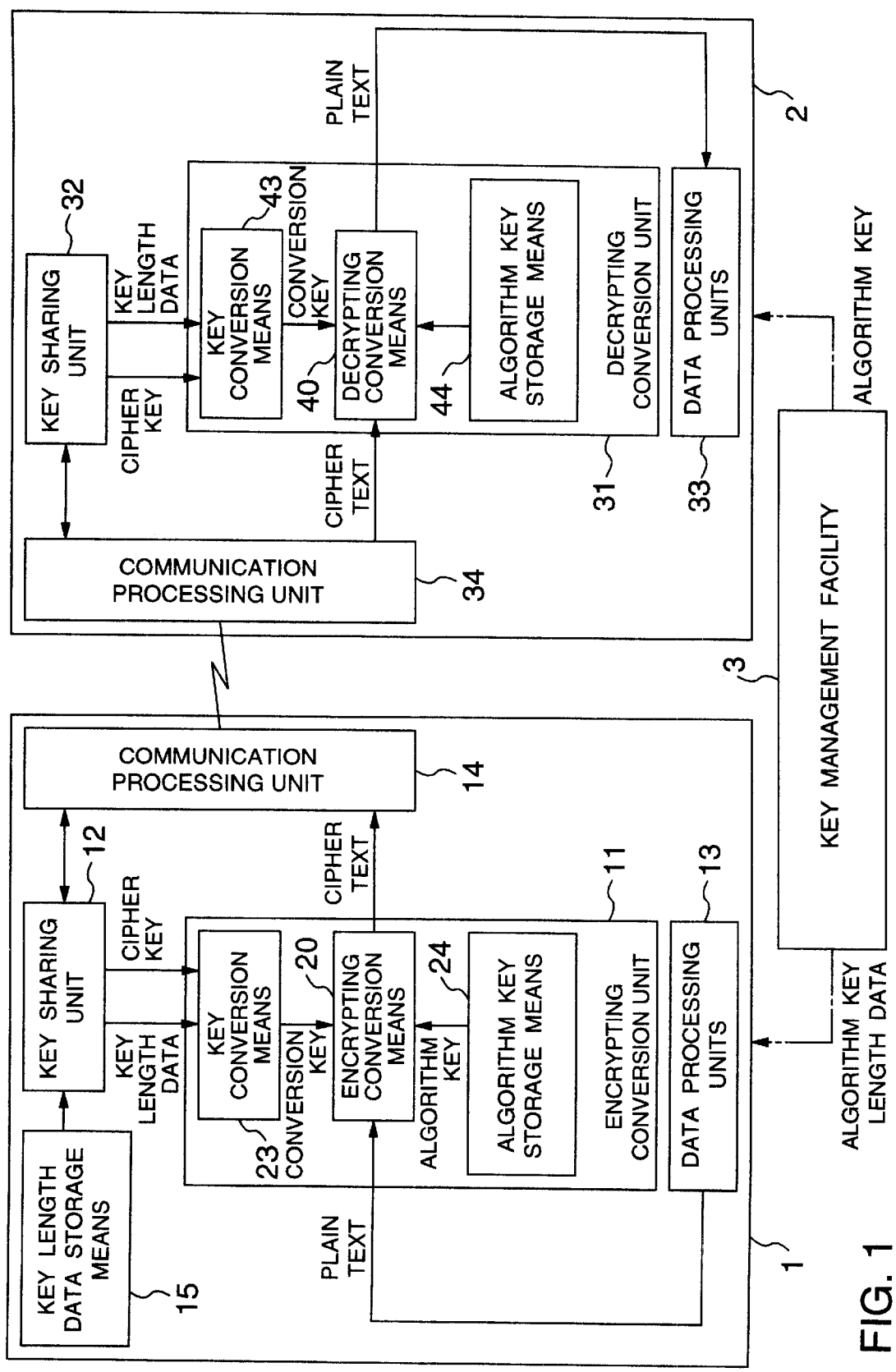
FIG. 1 is a block diagram showing a cryptographic communication system having a transmitter and a receiver according to an embodiment of the invention.

FIG. 1 is a block diagram showing the configuration of a cryptographic communication system in which a data transmitter equipped with an encrypting conversion apparatus of the invention cryptographically communicates with a data receiver equipped with a decrypting conversion apparatus of the invention. Referring to FIG. 1, the data transmitter 1 has an encrypting conversion unit 11, a key sharing unit 12, a data processing unit 13, a communication processing unit 14, and a key length data storage means 15. The data receiver 12 has a decrypting conversion unit 31, a key sharing unit 32, a data processing unit 33, and a communication processing unit 34. The data transmitter 1 may be a digital broadcasting receiver. The data receiver 2 may be a digital video recorder. In this case, the data processing units 13 and 33 process digital program data of, for example, MPEG2-TS (Transport Stream) distributed by digital broadcasting services. The data processing unit 13 performs a reception process, a multiplex/separation process, an expansion process, and a transmission process, respectively of digital program data, whereas the data processing unit 33 performs a reception process, an expansion process, and a storage process, respectively of digital program data.

The data transmitter 1 and data receiver 2 share data called a cipher key necessary for data encrypting and decrypting in order to start cryptographic communication. Sharing this cipher key is realized by a message exchange between the key sharing unit 12 of the data transmitter 1 and the key sharing unit 32 of the data receiver 2 via the communication processing units 14 and 34. In this case, the key length is determined in accordance with key length data stored in a key length data storage means 15 of the data transmitter 1. It is desired that the cipher key shared by the data transmitter 1 and data receiver 2 is changed each time data is transferred. This is because since a generated cryptogram is different if the cipher key is different, a cryptographic attack to a cryptogram by a third party becomes difficult. There are various methods of sharing a cipher key. For example, key exchange in a key distribution system by Diffie-Hellman may be used which is detailed, for example, in "Current Cryptograph" by Tatsuaki Okamoto, et al, published by Sangyo Tosho Kabushiki Kaisha, at pp. 200 to 202. With this key exchange, it is very difficult for a third party to infer a cipher key from a tapped message which was exchanged for sharing the cipher key, and it is possible to share a cipher key in high secrecy each time data is transferred.

After the cipher key is shared, the data processing unit 13 of the data transmitter 1 supplies the encrypting conversion unit 11 with data to be transmitted. Data supplied from the data processing unit 13 is still not encrypted, and such data is called hereinafter a "plain text". The encrypting conversion unit 11 is constituted of an encrypting conversion means 20, a key conversion means 23 and an algorithm key storage means 24. The key conversion means 23 generate a plurality set of data called a conversion key in accordance with the cipher key and key length data. The key length data represents the length of a cipher key determined by cipher key sharing. The algorithm key storage means 24 stores a plurality set of data called an algorithm key. An encrypting conversion algorithm to be executed by the encrypting conversion means 20 is determined by the algorithm key. By using the conversion key generated by the key conversion means 23 and the algorithm key stored in the algorithm key storage means 24, the encrypting conversion means 20 encrypts the plain text and outputs a cipher text. The cipher text generated by the encrypting conversion unit 11 is transmitted from the communication processing unit 14 to the data receiver 2, The communication processing unit 34 of the data receiver 2 receives the cipher text and supplies it to the decrypting conversion unit 31. The decrypting conversion unit 31 is constituted of a decrypting conversion means 40, a key conversion means 43 and an algorithm key storage means 44. The key conversion means 43 has a structure similar to that of the key conversion means 23, and generates a conversion key in accordance with the cipher key and key length data. The algorithm key storage means 44 has a structure similar to that of the algorithm key storage means 24, and stores an algorithm key. A decrypting conversion algorithm to be executed by the decrypting conversion means 40 is determined by the algorithm key. By using the conversion key generated by the key conversion means 24 and the algorithm key stored in the algorithm key storage means 44, the decrypting conversion means 40 decrypts the cipher text. In this case, only if the decrypting conversion means 20 uses the same algorithm key as that used by the encrypting conversion means 20, the decrypting conversion means 40 can decrypt the cipher text encrypted by the encrypting conversion means 20 into the original plain text. The plain text output from the decrypting conversion unit 31 is supplied to the data processing unit 33 to process data.

As described above, the data transmitter 1 and data receiver 2 can cryptographically communicate with each other only if they have the same algorithm key. Cryptographic communication with an authentication function can be realized by maintaining this algorithm key as secret information. Namely, if the correct algorithm key is held by only an authorized apparatus, cryptographic communication can be performed for only the authorized communication partner apparatus. In order to realize this, a key management facility 3 for generating algorithm keys and collectively managing them is provided as shown in FIG. 1. As shown, authorized apparatuses (in this example, the data transmitter 1 and data receiver 2) acquire the algorithm key from the key management facility 3 without being tapped by a third party. For example, an algorithm key managed by the key management facility 3 may be embedded in the algorithm key storage means 24 and 44 when the data transmitter 1 and data receiver 2 are manufactured. In this case, the data receiver 11 also acquires the key length data at the same time. In this manner, a cipher text transmitted from an authorized apparatus having a correct algorithm key can be decrypted only by an authorized apparatus having the correct algorithm key. In addition to the cipher key, the algorithm key is also secret information so that a cryptographic attack by a third party to a cipher text flowing on the communication path becomes more difficult.

Furthermore, since the data transmitter 1 generates a cipher key basing upon the key length data acquired from the key management facility 3, the length of the cipher key can be renewed. For example, if renewed key length data is embedded in a newly manufactured data transmitter, cryptographic communication with the newly manufactured data transmitter can be performed by using a cipher key having the renewed length. Therefore, it is possible to elongate the key length of a cipher key in the future to thereby further improve security. The key length may be changed in each area where apparatuses are shipped.

Figure 2:
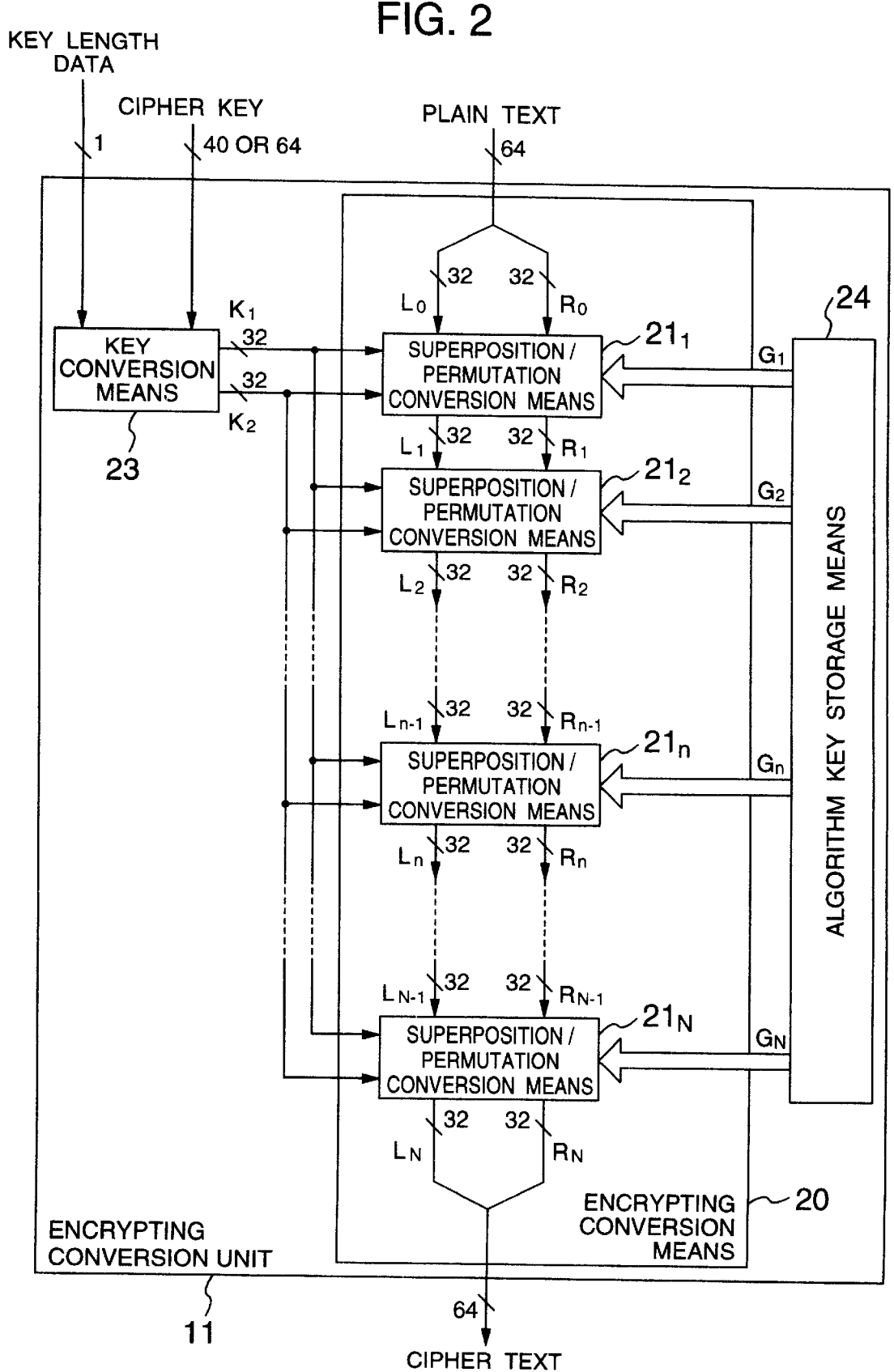
FIG. 2 is a block diagram of an encrypting conversion unit shown in FIG. 1.

FIG. 2 is a detailed block diagram showing an example of the encrypting conversion unit 11. It is assumed that the encrypting conversion unit 11 receives a plain text of 64 bits, a cipher key of 40 or 64 bits and key length data of one bit, and outputs a cipher text of 64 bits. With reference to the key length data, the key conversion means 23 converts the cipher key into conversion keys K1 and K2 each having 32 bits. The key length data takes "0" if the cipher key has 40 bits, and "1" if the cipher key has 64 bits. Conversion by the key conversion means 23 will be later described. The encrypting conversion means 20 of the encrypting conversion unit 11 is constituted of N substitution/permutation conversion means $21_1$ to $21_N$. A conversion algorithm to be executed by the substitution/permutation conversion means $21_n$ (where $1 \leq n \leq N$) is determined by an algorithm key $G_n$ stored in the algorithm key storage means 24.

A plain text is separated into upper 32 bits $R_0$ and lower 32 bits $L_0$ and input to the substitution/permutation conversion means $21_1$ whereat a first encrypting conversion is performed by using the conversion keys K1 and K2 to output 32 bits $R_1$ and 32 bits $L_1$. These bits $R_1$ and $L_1$ are input to the substitution/permutation conversion means $21_2$ whereat a second encrypting conversion is performed by using the conversion keys K1 and K2 to output 32 bits $R_2$ and 32 bits $L_2$. Such encrypting conversion is repeated N times and the last outputs of 32 bits $R_N$ and 32 bits $L_N$ are combined to obtain a cipher text of 64 bits. The total number N of encrypting conversion repetitions is called a round number.

Consider now the case wherein the cipher key is fixed and the same data is input to an optional combination of two or more consecutive substitution/permutation conversion means selected from all the substitution/permutation conversion means. In this case, the conversion result is determined by the algorithm keys Gn. In the encrypting conversion apparatus of this invention, it is assumed that only algorithm keys which provide different conversion results for all combinations are used. Namely, a periodicity does not appear on encrypting conversion which uses a plurality of substitution/permutation conversion means. In this way, secrecy of encrypting conversion can be improved.

Figure 3:
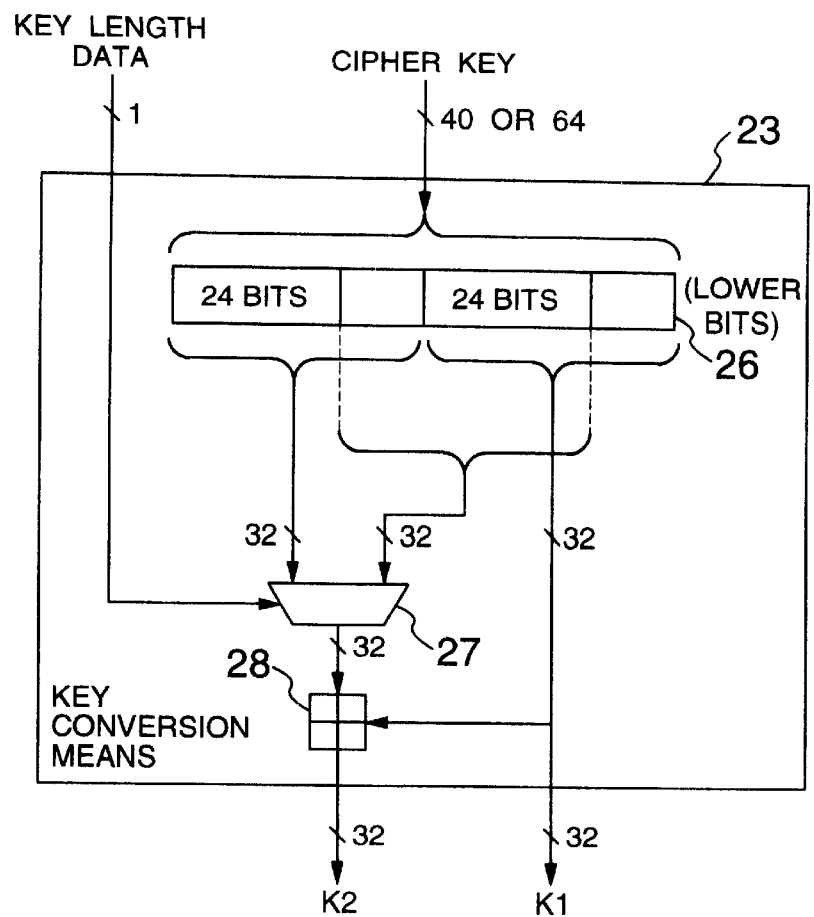
FIG. 3 is a block diagram of a key conversion means shown in FIG. 2.

FIG. 3 is a block diagram showing an example of the key conversion means 23 shown in FIG. 2. Referring to FIG. 3, the key conversion means 23 is constituted of a register 26 of a 64-bit length, a multiplexer 27 and an addition operation unit 28. A cipher key is first loaded in the register 26. If the cipher key has 40 bits, it is loaded in the lower 40 bits of the register 26, whereas if the cipher key has 64 bits, it is stored in all bits of the register 26. The lower 32 bits of the register 26 are used as the conversion key K1. If the key length data is "0", 32 bits of the register 26 from the lower 9-th bit to the lower 40-th bit are selected as an input to the multiplexer 27. If the key length data is "1", the upper 32 bits of the register 26 are selected as an input to the multiplexer 27. An output of the multiplexer 27 is subjected to a 32-bit addition of K1 at the addition operation unit 28, the result being K2. A result of the 32-bit addition is a remainder of a usual addition result divided by 2 raised to a power of 32.

Figure 4:
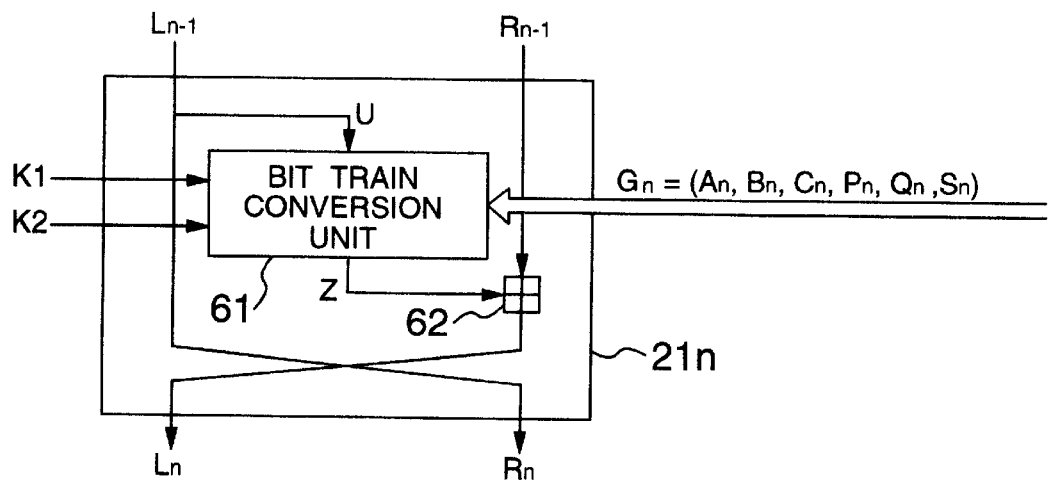
FIG. 4 is a block diagram of a substitution/permutation conversion means shown in FIG. 2.

FIG. 4 is a block diagram of the substitution/permutation conversion means $21_n$ shown in FIG. 2 which executes the n-th ($1 \leq n \leq N$) encrypting conversion.

Referring to FIG. 4, the substitution/permutation conversion means $21_n$ is constituted of a bit train conversion unit 61 and an addition operation unit 62. $R_{n-1}$ and $L_{n-1}$ are converted into $R_n$ and $L_n$ by using the conversion keys K1 and K2. First, the substitution/permutation conversion means $21_n$ inputs $L_{n-1}$ to the bit train conversion unit 61. The conversion algorithm to be executed by the bit train conversion unit 61 is determined by the algorithm key $G_n$. An input U to the bit train conversion unit 61 is related to an output Z from the unit 61 by the following equation:

$$Z = F_{Gn}(K1, K2, U)$$

where the function $F_{Gn}$, indicates a conversion by the bit train conversion unit 61. The algorithm key $G_n$ is constituted of the following data:

$$G_n = (A_n, B_n, C_n, P_n, Q_n, S_n)$$

where $A_n$, $B_n$, and $C_n$ are 32-bit data, and $P_n$, $Q_n$, and $S_n$ are expressed by $1 \leq P_n \leq 31$, $1 \leq Q_n \leq 31$, and $1 \leq S_n \leq 31$. The values of the algorithm key $G_n$ may take different values at each n ($1 \leq n \leq N$).

Next, $R_{n-1}$ is input to the addition operation unit 62 whereat a 62-bit addition of $Z_n$ is performed, the result being $L_n$. $L_{n-1}$ is used as $R_n$. The above-described conversion is summarized as in the following:

$$L_n = R_n + F_{Gn}(K1, K2, L_{n-1})$$

$$R_n = L_{n-1}$$

Figure 5:
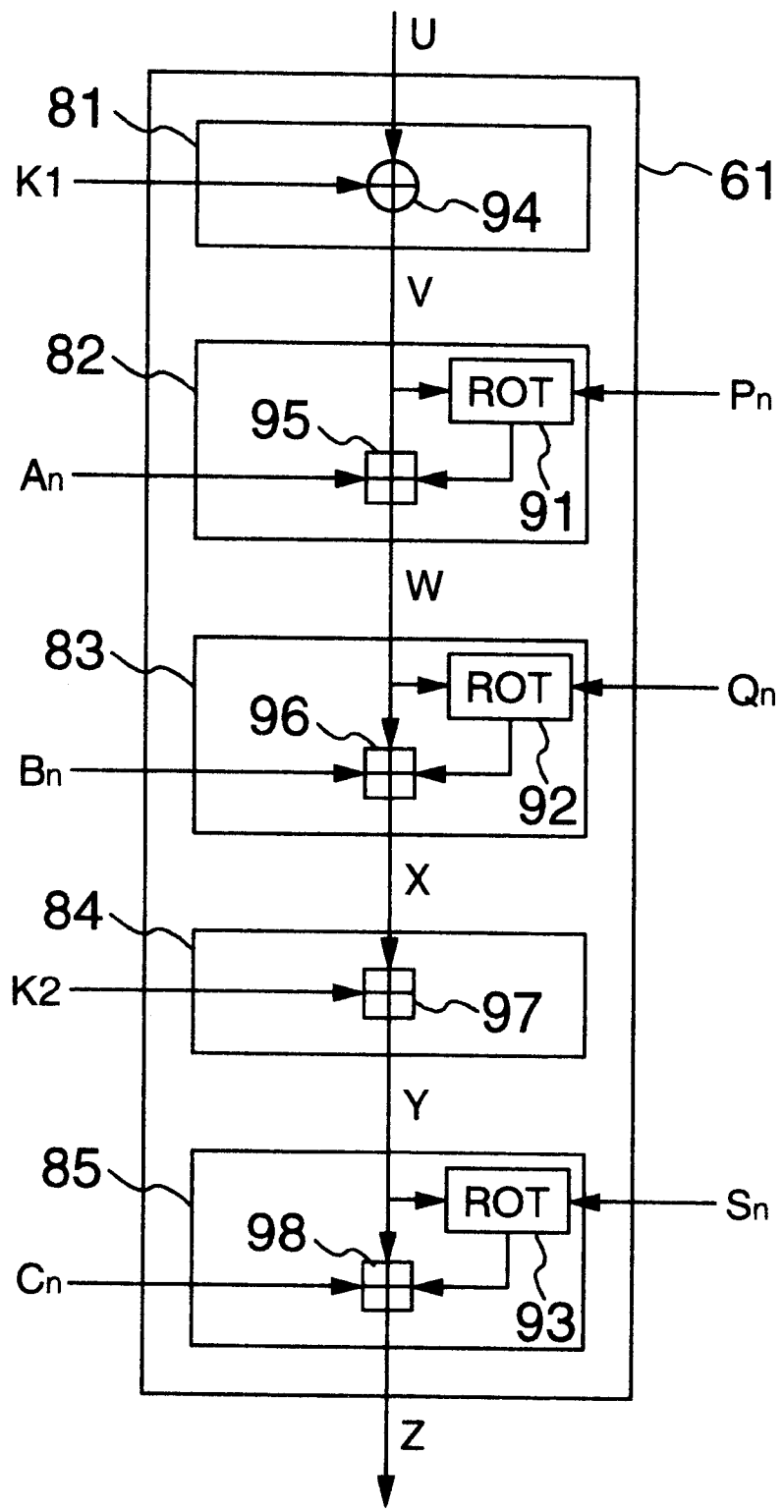
FIG. 5 is a block diagram of a bit train conversion unit shown in FIG. 4.

FIG. 5 is a block diagram showing an example of the bit train conversion unit 61 shown in FIG. 4. The bit train conversion unit 61 is constituted of five bit train converters 81 to 85. The bit train converter 81 includes an exclusive logical sum (exclusive-OR) unit 94. The bit train converter 82 includes an addition calculation unit 95 and a cyclic shift unit 91. The bit train converter 83 includes an addition calculation unit 96 and a cyclic shift unit 92. The bit train converter 84 includes an addition operation unit 97. The bit train converter 85 includes an addition calculation unit 98 and a cyclic shift unit 93.

The exclusive logical sum unit 94 of the bit train converter 81 executes an exclusive logical sum operation of two input values. Of the two input values, one is K1 shown in FIG. 4 and the other is U shown in FIG. 4, i.e., an output value to the bit train conversion unit 61 or bit train converter 81. A conversion by the bit train converter 81 is given by:

$$V = K1 \oplus U$$

where V is an output value of the bit train converter 81 and an expression of $X \oplus Y$ indicates an exclusive logical sum of X and Y.

The cyclic shift unit 91 of the bit train converter 82 cyclically shifts to the left only the data $P_n$ ($1 \leq P_n \leq 31$) which is a fraction of the algorithm key $G_n$. The addition operation unit 95 performs a 32-bit addition of three inputs. Of the three inputs, one is the data $A_n$ which is a fraction of the algorithm key $G_n$ shown in FIG. 4, another is an input value V to the bit train converter 82, and the other is the data Pn to be cyclically shifted to the left. A conversion by the bit train converter 82 is given by:

$$W = V + (V<<<P_n) + A_n$$

where W is an output value of the bit train converter 82 and an expression of $X<<<Y$ indicates a cyclic shift of X to the left by Y-bit.

The cyclic shift unit 92 of the bit train converter 83 cyclically shifts to the left only the data $Q_n$ ($1 \leq Q_n \leq 31$) which is a fraction of the algorithm key $G_n$. The addition operation unit 96 performs a 32-bit addition of three inputs. Of the three inputs, one is the data $B_n$ which is a fraction of the algorithm key $G_n$ shown in FIG. 4, another is an input value W to the bit train converter 83, and the other is the data Pn to be cyclically shifted to the left. A conversion by the bit train converter 83 is given by:

$$X = W + (W<<<Q_n) + B_n$$

where W is an output value of the bit train converter 83.

The addition operation unit 97 of the bit train converter 84 performs a 32-bit addition of two inputs. Of the two inputs, one is K2 shown in FIG. 2 and the other is an input X to the bit train converter 84. A conversion by the bit train converter 84 is given by:

$$Y = K2 + X$$

where Y is an output value of the bit train converter 84.

The cyclic shift unit 93 of the bit train converter 85 cyclically shifts to the left only the data $S_n$ ($1 \leq S_n \leq 31$) which is a fraction of the algorithm key $G_n$. The addition operation unit 98 performs a 32-bit addition of three inputs. Of the three inputs, one is the data $G_n$ which is a fraction of the algorithm key $G_n$ shown in FIG. 4, another is an input value Y to the bit train converter 85, and the other is the data Sn to be cyclically shifted to the left. A conversion by the bit train converter 85 is given by:

$$Z = Y + (Y<<<S_n) + C_n$$

where Z is an output value of the bit train converter 85.

As described above, the five bit train converters 81 to 85 of the bit train conversion unit 61 perform a bit train conversion by processing data to be converted. The order of processing data by the five bit train converters 81 to 85 of the bit train conversion unit 61 may be changed. This changed configuration is also included in the scope of the present invention. For-example, in place of the order of bit train converter 81→82→83→84→85, the order of bit train conversion functions 84→83→81→85→82 may also be used. Although the five bit train converters 81 to 85 are constituted of one exclusive logical sum unit, three cyclic shift units, and four addition operation units, they may be constituted of at least one addition operation unit and at least one cyclic shift operation unit capable of executing substitution/permutation/mixture conversion, with similar expected advantages of the invention.

Figure 6:
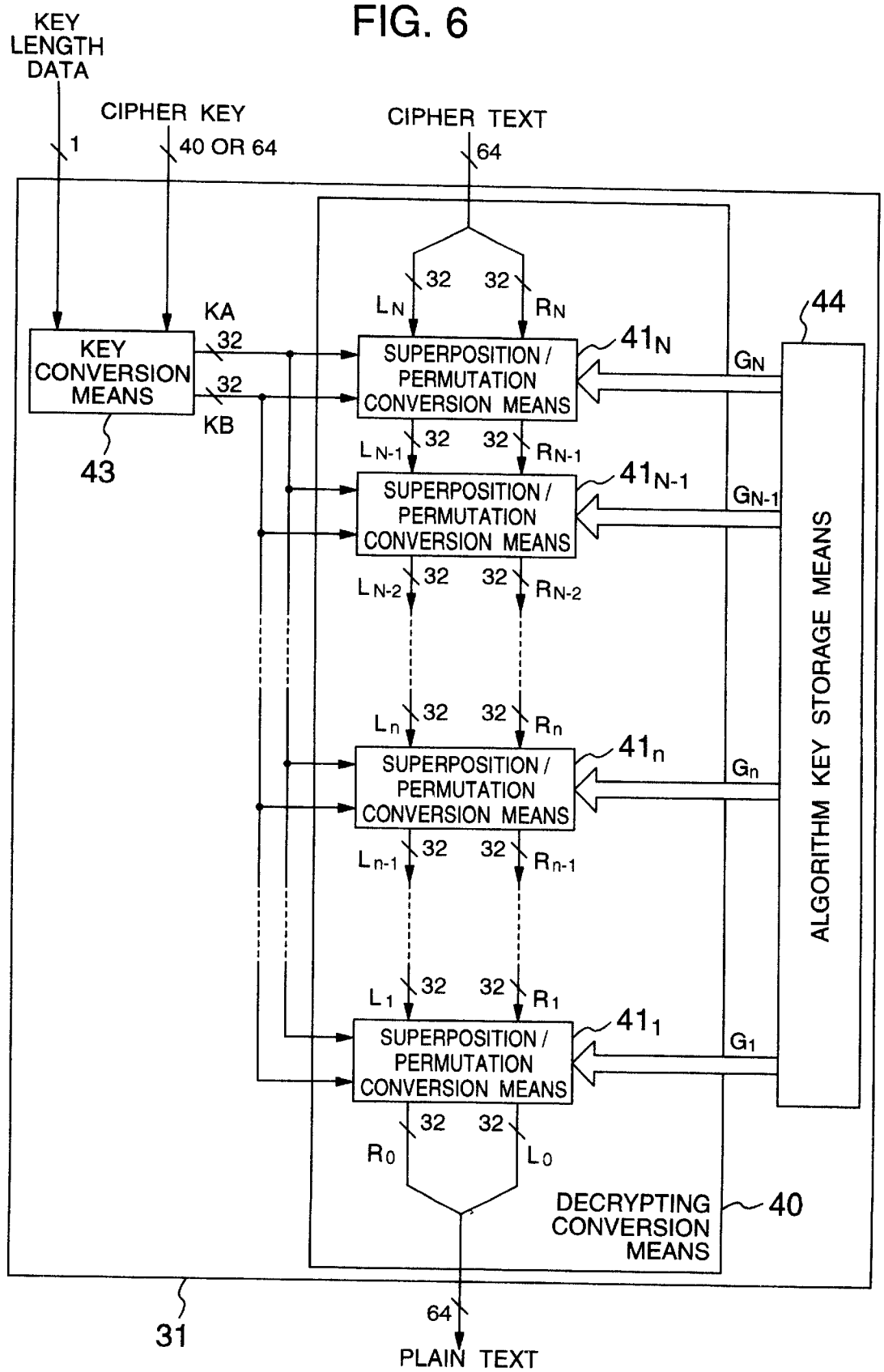
FIG. 6 is a block diagram of a decrypting conversion unit shown in FIG. 1.

FIG. 6 is a block diagram showing the details of the decrypting conversion unit 31 shown in FIG. 1. The decrypting conversion unit 31 decrypts a cipher text encrypted by the encrypting conversion unit 11 shown in FIG. 2 into the original plain text. The decrypting conversion unit 31 receives a cipher text of 64 bits, a cipher key of 40 bits or 64 bits, and key length data of one bit, and outputs a plain text of 64 bits. The decrypting conversion means 40 of the decrypting conversion unit 31 is constituted of N substitution/permutation conversion means $41_n$ to $41_n$. A conversion algorithm to be executed by the substitution/permutation conversion means 41n (where $1 \leq n \leq N$) is determined by an algorithm by $G_n$ stored in the algorithm key storage means 44.

A cipher text is separated into upper 32 bits RN and lower 32 bits $L_N$ and input to the substitution/permutation conversion means 41, whereat a first decrypting conversion is performed by using conversion keys K1 and K2 to output 32 bits $R_{N-1}$, and 32 bits $L_{N-1}$. These bits $R_{N-1}$ and $L_{N-1}$ are input to the substitution/permutation conversion means $41_2$ whereat a second decrypting conversion is performed by using the conversion keys K1 and K2 to output 32 bits $R_{N-2}$ and 32 bits $L_{N-2}$. Such decrypting conversion is repeated N times and the last outputs of 32 bits $R_0$ and 32 bits $L_0$ are combined to obtain a plain text of 64 bits. Similar to the encrypting conversion, the total number N of decrypting conversion repetitions is called a round number.

Consider now the case wherein the cipher key is fixed and the same data is input to an optional combination of two or more consecutive substitution/permutation conversion means selected from all the substitution/permutation conversion means. In this case, the conversion result is determined by the algorithm keys Gn. In the encrypting conversion apparatus of this invention, it is assumed that only algorithm keys which provide different conversion results for all combinations are used. Namely, a periodicity does not appear on decrypting conversion which repetitively uses substitution/permutation conversion means.

Figure 7:
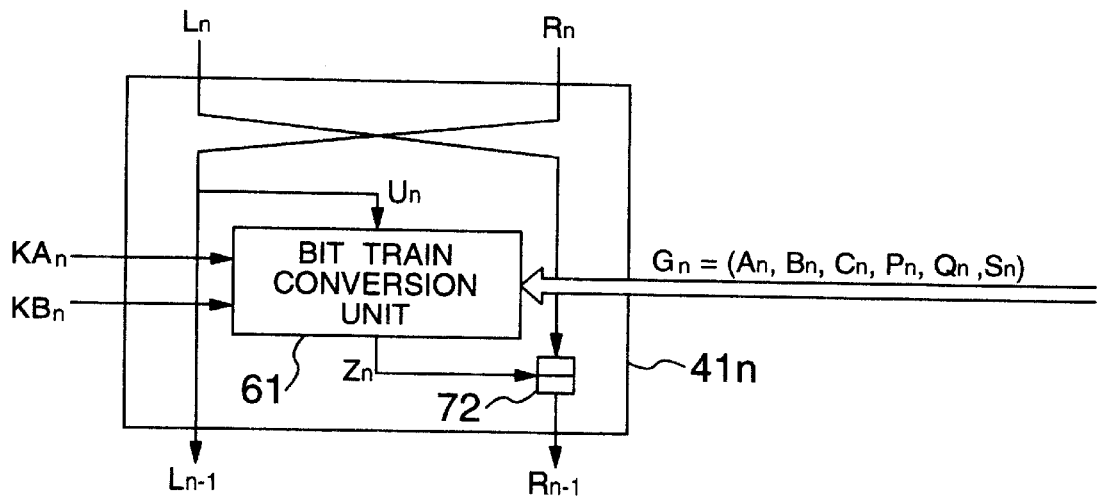
FIG. 7 is a block diagram of a substitution/permutation conversion means shown in FIG. 6 according to another embodiment of the invention.

FIG. 7 is a block diagram of the substitution/permutation conversion means $41_n$ shown in FIG. 6 which executes the (N+1−n)-th ($1 \leq n \leq N$) decrypting conversion. Referring to FIG. 7, the substitution/permutation conversion means $41_n$ is constituted of a bit train conversion unit 61 described with reference to FIG. 5 and a subtraction operation unit 72. $R_n$ and $L_n$ are converted into $R_{n-1}$ and $L_{n-1}$ by using the conversion keys K1 and K2. First, the substitution/permutation conversion means $41_n$ inputs $R_n$ to the bit train conversion unit 61. The conversion algorithm to be executed by the bit train conversion unit 61 is determined by the algorithm key $G_n$. An input to the bit train conversion unit 61 is represented by U and an output from this unit 61 is represented by Z. Next, $L_n$ is input to the subtraction operation unit 72 to perform a 32-bit subtraction of Z, the result being $R_n$. A result of the 32-bit subtraction is a usual subtraction result added to 2 raised to a power of 32, if the usual subtraction result is negative. Lastly, $R_n$ is used $L_{n-1}$. The above-described conversion is summarized as in the following:

$R_{n-1}=L_n-F_{Gn}(K1, K2, R_n)$ $L_{n-1}R_n$

This conversion is an inverse conversion of the substitution/permutation conversion means 21n described with reference to FIG. 2. If the decrypting conversion unit 31 has the same cipher key and algorithm key as those of the encrypting conversion unit 11, the decrypting conversion unit 31 can decrypt data encrypted by the encrypting conversion unit 11, in the manner described above.

The embodiment of the data transmitter 1 equipped with the encrypting conversion unit and the data receiver 2 equipped with the decrypting conversion unit have been described above in detail. It is obvious that a configuration partially changing the above-described configuration is included in the scope of the present invention. For example, although the cipher key has 40 bits or 64 bits and the key length data has one bit, the invention is not limited only thereto. For example, the cipher key may have the desired number of bits in the range from 40 to 128 bits and the key length data has 7 bits in order to identify each cipher key. In this case, the key conversion means is provided with a selector which selects a position where a cipher key is selected in accordance with the input key length data, in order to generate two conversion keys of 32 bits. Four conversion keys of 32 bits may be generated for a cipher key having 64 bits or more. In this case, N substitution/permutation conversion means are divided into two groups to each of which two conversion keys are supplied.

In order to generate a plurality of conversion keys, substitution/permutation conversion means used for encrypting conversion may be used. For example, a key conversion means for generating eight conversion key of 32 bits will be described.

Figure 8:
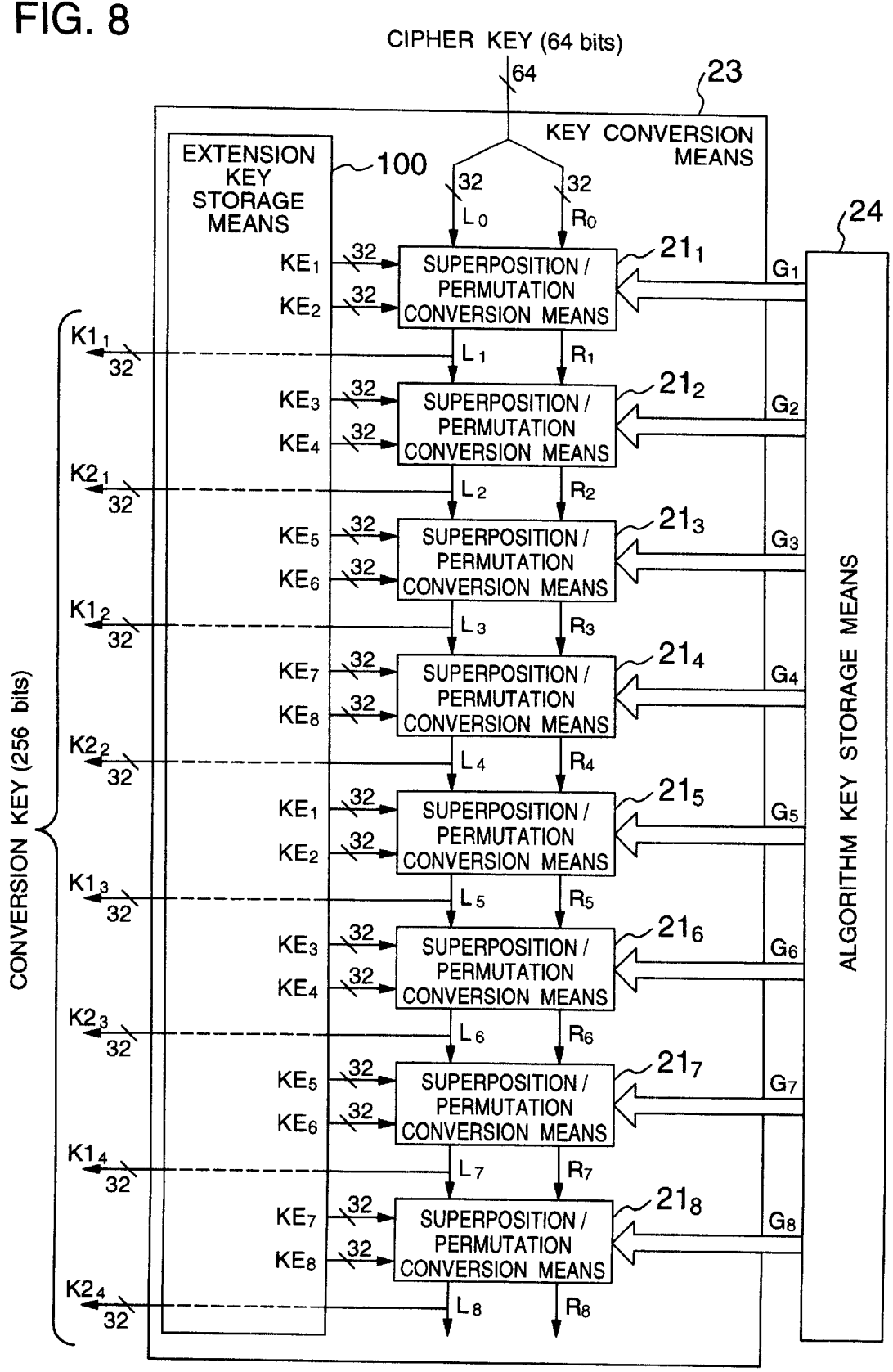
FIG. 8 is a block diagram of a key conversion means according to another embodiment of the invention.

Referring to FIG. 8, the key conversion means 23 is constituted of eight substitution/permutation conversion means $21_1$ to $21_8$ and an extension key storage means 100. The extension key storage means 100 stores eight extension keys $KE_1$ to $KE_8$ having a 32-bit length to be used for conversion keys. A cipher key having 64 bits is sequentially converted by the eight substitution/permutation conversion means $21_1$ to $21_8$. A conversion algorithm to be used by each substitution/permutation conversion means is determined by each algorithm key stored in the algorithm storage means 24. Extension keys stored in the extension key storage means 100 are input to each substitution/permutation conversion means. For example, extension keys $KE_3$ and $KE_4$ are input to the substitution/permutation conversion means $21_2$.

By performing the conversion, outputs $L_1$ to $L_8$ of the eight substitution/permutation conversion means $21_1$ to $21_8$ are used as the eight extension keys.

The same extension keys stored in the extension key storage means may be used each time data is processed, or may be renewed by a method similar to the algorithm keys. A key sharing process may also be executed for the extension keys by a method similar to the cipher key. The key conversion means 23 described with reference to FIG. 8 can use the substitution/permutation conversion means same as that used by encrypting conversion. Therefore, for example, if the encrypting conversion apparatus of the invention is implemented by hardware, encrypting conversion can be realized with a small circuit scale and with high security.

Next, the encrypting conversion apparatus and decrypting conversion apparatus according to another embodiment of the invention will be described.

The block diagram of the encrypting conversion apparatus of this embodiment is the same as that shown in FIG. 2 of the first embodiment described earlier.

Figure 9:
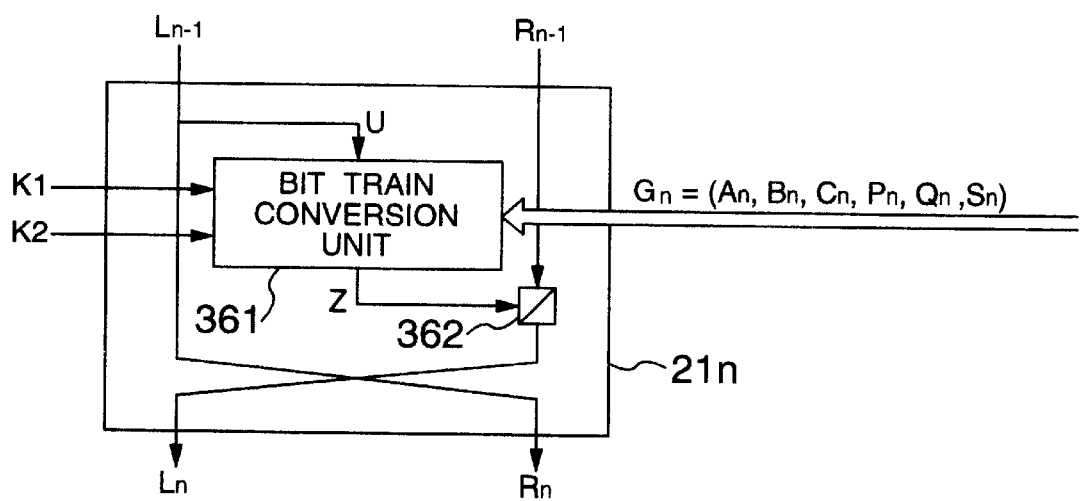
FIG. 9 is a block diagram of a substitution/permutation means according to another embodiment of the invention.

FIG. 9 is a block diagram of a substitution/permutation conversion means $21_1$ of this embodiment in the encrypting conversion unit 11 shown in FIG. 2 which executes the n-th encrypting conversion. Referring to FIG. 9, the substitution/permutation conversion means $21_n$ is constituted of a bit train conversion unit 361 and an operation unit 362. The operation unit 362 executes either an exclusive logical sum operation or an addition operation of two inputs. Which operation the operation unit 362 executes is determined by an algorithm key. The conversion process to be executed by the substitution/permutation conversion means $21_n$ is the same as described with the first embodiment.

Figure 10:
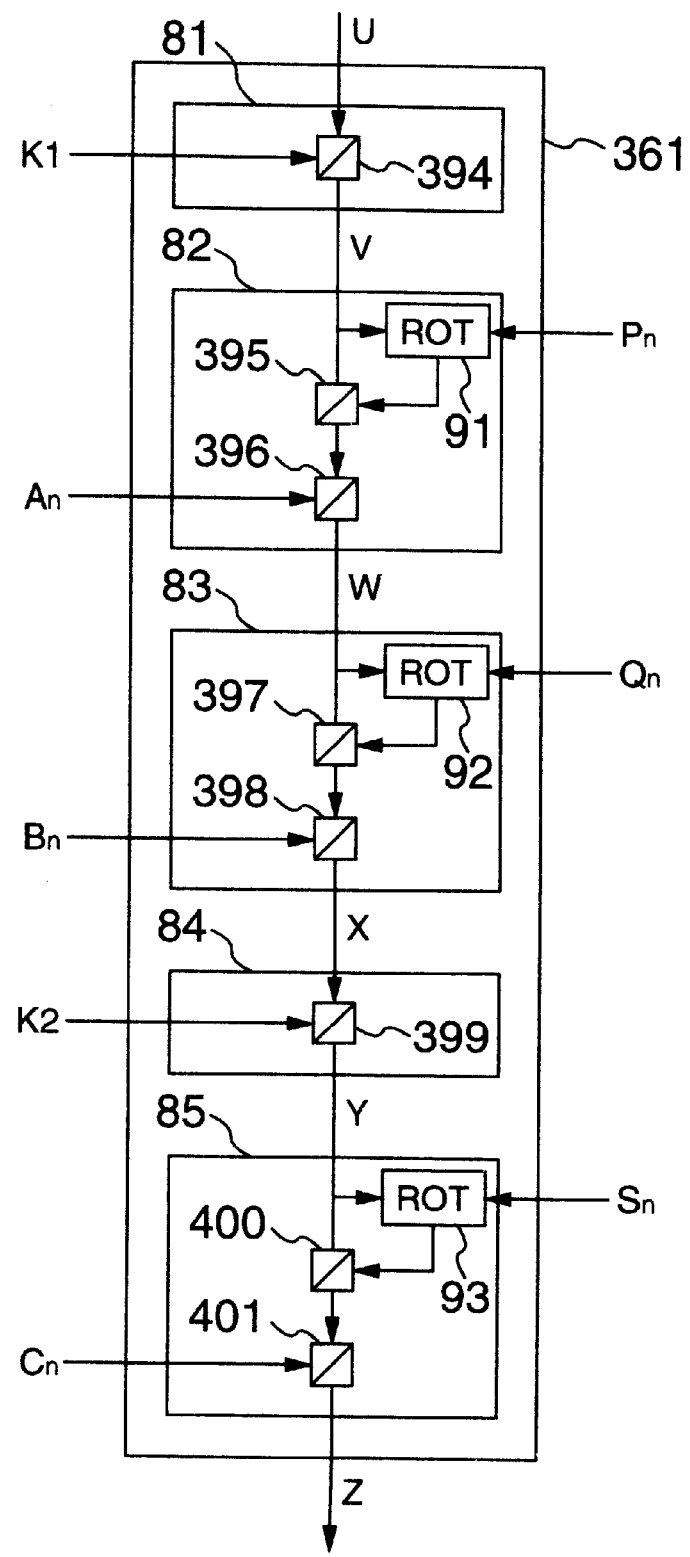
FIG. 10 is a block diagram of a bit train conversion unit according to another embodiment of the invention.

FIG. 10 is a block diagram showing an example of the bit train conversion unit 361 shown in FIG. 9. The bit train conversion unit 361 is constituted of five bit train converters 81 to 85. The bit train converter 81 includes an operation unit 394. The bit train converter 82 includes an operation unit 395, an operation unit 396, and a cyclic shift unit 91. The bit train converter 83 includes an operation unit 397, an operation unit 398, and a cyclic shift unit 92. The bit train converter 84 includes an operation unit 399. The bit train converter 85 includes an operation unit 400, an operation unit 401, and a cyclic shift unit 93. Similar to the operation unit 362 shown in FIG. 9, each of the operation units 394 to 401 executes either an exclusive logical sum operation or an addition operation of two inputs. Which operation the operation units 394 to 401 execute is determined by an algorithm key. The bit train conversion unit 361 performs a bit train conversion by applying bit train converter 81 to 85 to data to be converted. As described above, in the encrypting conversion apparatus of this embodiment, the numbers of addition operations and exclusive logical sum operations can be determined by algorithm keys.

Next, a cryptographic communication system using the encrypting conversion apparatus and decrypting conversion apparatus according to an embodiment of the invention will be described.

Figure 11:
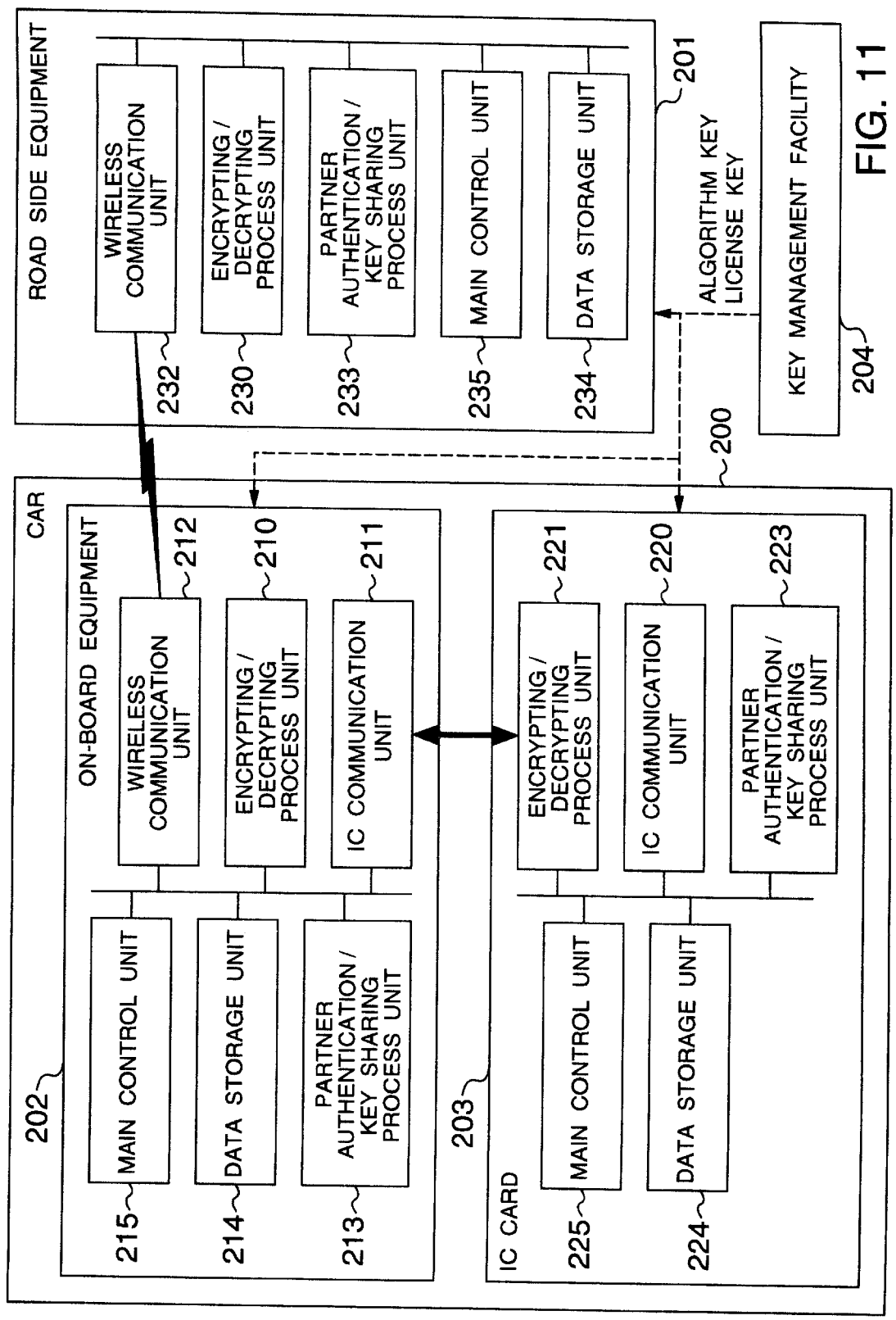
FIG. 11 is a block diagram showing an electronic toll collecting system as another embodiment of cryptographic communication of the invention.

FIG. 11 is a block diagram showing an electronic toll collection system. The electronic toll collection system can collect, through electronic account settlement, a toll from an IC card possessed by a driver of a car running on a toll road, at a road side equipment installed on the toll road, without stopping the car. Such an electronic toll collection system is expected to alleviate traffic congestion and improve user convenience through electronic account settlement with IC cards.

The electronic toll collection system shown in FIG. 11 includes a car 200, a road side equipment 201, an on-board equipment 202, an IC card 203, and a key management facility 204.

The car 200 has the on-board equipment 202 into which the IC card 203 is inserted while the car 200 is driven.

The road side equipment 201 is installed on the toll road and has a function of collecting a toll while the car 200 passes by.

The IC card 203 stores in advance contract information of the electronic toll collection system. While the car 200 passes by the road side equipment, the contract information is transferred by wireless communication from the on-board equipment 202 inserted with the IC card 203, in order to receive routing information and account settlement information from the road side equipment 201.

In order to maintain security and reliability of such processes, it is necessary to verify authentication of contract information, routing information and account settlement information and to prevent illegal alteration and tapping of the information. Between the IC card and on-board equipment 202 and between the on-board equipment 202 and road side equipment, it is necessary to execute an authentication process for a communication partner, a sharing process of sharing a cipher key to be used for encrypting/decrypting exchange data, and a cryptographic communication using the shared cipher key. To these third party authentication process, cipher key sharing process and cryptographic communication, the encrypting and decrypting conversion apparatuses of the invention can be applied.

In order to realize the above-described processes, the on-board equipment 202, IC card 203 and road side equipment 201 are required to store in advance a shared algorithm key and a license key issued by the key management facility 204. For example, these keys may be embedded during manufacture.

The details of the algorithm key and encrypting and decrypting conversions set by the algorithm key have been given above.

The license key is embedded in an authorized equipment as secret information and is used for reliably executing the authentication process and cipher key sharing process. Consider for example that an equipment B confirms whether or not an equipment A is an authorized equipment, in order to communicate with the equipment A. In this case, the equipment A provides the equipment B with certification that the license key of the equipment A is correct. Since the license key is secret information, the equipment A is required to provide the equipment B with certification that the license key is correct, without making open the license key. This certification can be realized by utilizing cryptographic techniques. For example, a symmetric key algorithm is described in ISO 9798-2 which is international specifications for security mechanism. As a specific example of the symmetric key algorithm, the encrypting and decrypting conversion apparatuses of the invention can be used.

Elements constituting the apparatuses shown in FIG. 11 will be described.

The road side equipment 201 is constituted of a wireless communication unit 232, an encrypting/decrypting process unit 230, a partner authentication/key sharing process unit 233, a main control unit 235, and a data storage unit 234.

The on-board equipment 202 is constituted of a wireless communication unit 212, an encrypting/decrypting process unit 210, an IC card communication unit 211, a partner authentication/key sharing process unit 213, a data storage unit 214, and a main control unit 215.

The IC card 203 is constituted of an IC card communication unit 221, an encrypting/decrypting process unit 220, a partner authentication/key sharing process unit 223, a data storage unit 224, and a main control unit 225.

The encrypting/decrypting process units 210, 220 and 230 have the encrypting and decrypting conversion apparatuses of the invention described previously and can encrypt and decrypt data.

The IC card communication units 211 and 221 are used for communication between the on-board equipment 202 and IC card 203.

The wireless communication units 212 and 232 are used for wireless communication between the on-board equipment 202 and road side equipment 201.

The encrypting/decrypting process units 210, 220 and 230 execute the authentication process of confirming whether a communication partner is authorized and a sharing process of sharing a cipher key to be used for data encryption and decryption. The partner authentication/key sharing process unit 213 uses an encrypting/decrypting conversion function supplied from the encrypting/decrypting process unit 210 in order to execute the partner authentication and key sharing process. In order to realize similar functions, the partner authentication/key sharing process unit 223 uses the encrypting/decrypting process unit 220. Similarly, the partner authentication/key sharing process unit 233 uses the encrypting/decrypting process unit 230.

The data storage units 214, 224 and 234 store the algorithm key and license key acquired from the key management facility 204, and may also store contract information, routing information and account settlement information.

Figure 12:
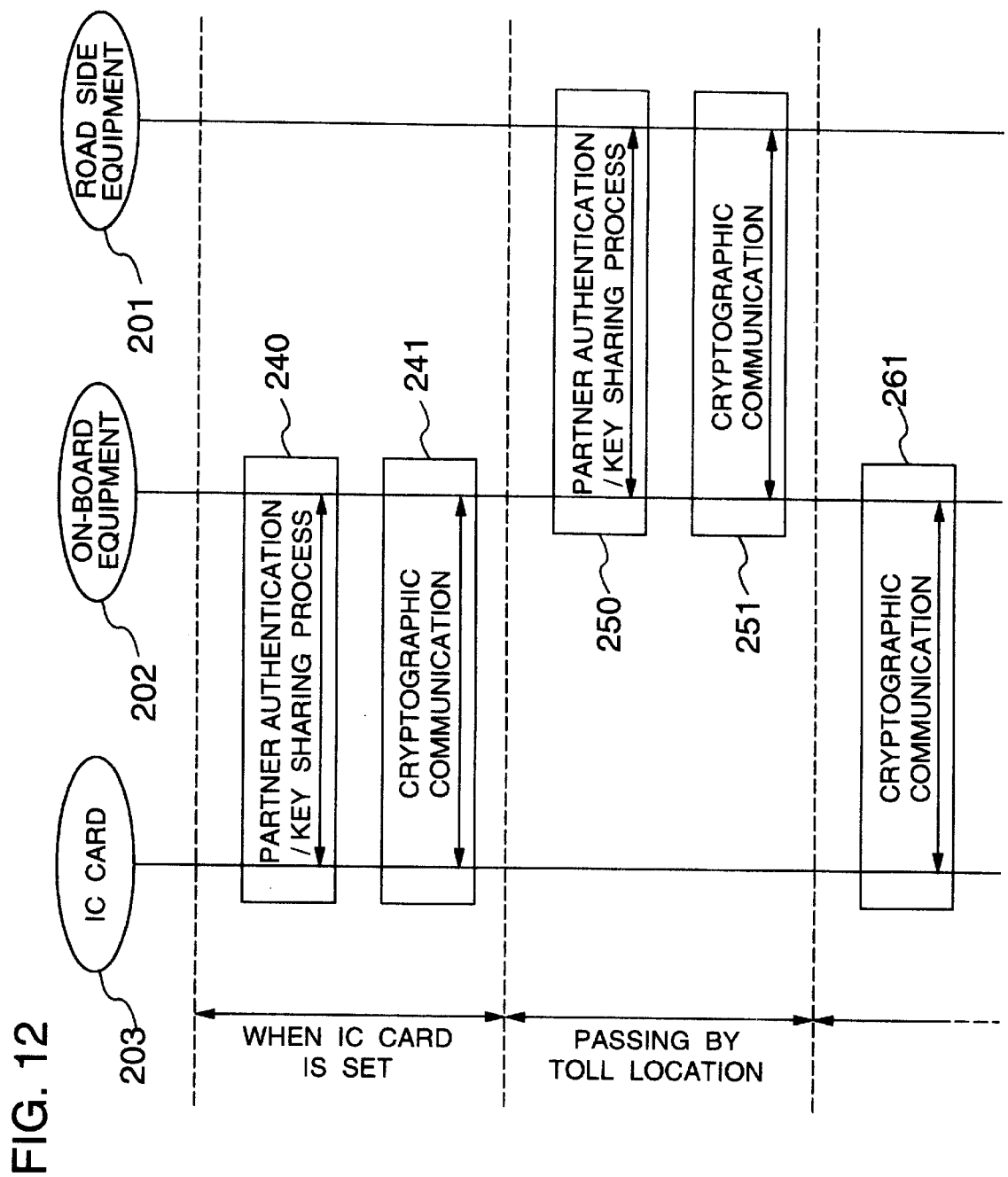
FIG. 12 is a chart illustrating communication flows of the electronic toll collecting system.

FIG. 12 is a flow chart illustrating communications to be executed by the electronic toll collection system shown in FIG. 11.

In the flow chart shown in FIG. 12, a partner authentication/key sharing process 240 is first performed between the IC card 203 and on-board equipment 202 when the IC card 203 shown in FIG. 11 is set to the on-board equipment 202. After the partner authentication/key sharing process 240 is succeeded, the IC card 203 performs a cryptographic communication 241 to transfer contract information to the on-board equipment 202. Upon reception of the contract information from the IC card 203, the on-board equipment stores in secret the contract information in the data storage unit 214 (FIG. 11).

Next, a partner authentication/key sharing process 250 is performed between the on-board equipment 202 and road side equipment 201 while the car 200 shown in FIG. 11 passes by the road side equipment 201. After the partner authentication/key sharing process 250 is succeeded, the on-board equipment 202 performs a cryptographic communication 251 to transfer the contract information supplied from the IC card to the road side equipment 201. This cryptographic communication 251 is also used for transferring routing information and account settlement information from the road side equipment 201, to the on-board equipment 202.

Next, the on-board equipment 202 performs a cryptographic communication 261 to transfer the routing information and account settlement information acquired from the road side equipment 201, to the IC card 203.

Account settlement for road toll is made between the IC card 203 and road side equipment 201. However, communication between the IC card 201 and road side equipment 201 is required to use the on-board equipment 202. In this case, if the on-board equipment 202 make an illegal process, an illegal account settlement may be performed. In order to avoid such a process, it is necessary for the road side equipment 201 to identify the on-board equipment 202 used with the IC card 203 for account settlement. For example, the onboard equipment 202 is assigned an identification number and transfers it to the IC card 203 during the partner authentication/key sharing process 240 with the IC card.

The IC card 203 generates a digital signature for both the identification number of the on-board equipment 202 and account settlement history of the IC card 203 and returns them to the on-board equipment 202. The onboard equipment 202 transfers the identification number and the digital signature acquired from the IC card 203, to the road side equipment 201 during the partner authentication/key sharing process 250. Thereafter, the road side equipment 201 verifies the digital signature generated by the IC card 203 to check the time when the on-board equipment 202 was used.

It is also necessary to prevent a third party to alter encrypted data flowing on a communication path during the cryptographic communication 241, 251 and 261. In order to realize this, it is necessary to perform a message authentication capable of judging whether the received message is correct. In order to perform the message authentication, a transmitter and a receiver shares in advance a message authentication key which is kept in secret. Sharing the message authentication key is performed, for example, in the partner authentication/key sharing process 250 shown in FIG. 12. The transmitter generates data called a message authentication code (MAC) from a message to be transferred and the message authentication key. The transmitter transmits the message together with the message authentication code to the receiver. The receiver verifies the received message authentication code by using the message authentication key. It is possible to judge from this verification whether the received message was altered. As the message authentication, for example, a method using a symmetric key algorithm is described in ISO 9797 which is international specifications for security mechanism. As a specific example of the symmetric key algorithm, the encrypting and decrypting conversion apparatuses of the invention can be used.

Figure 13:
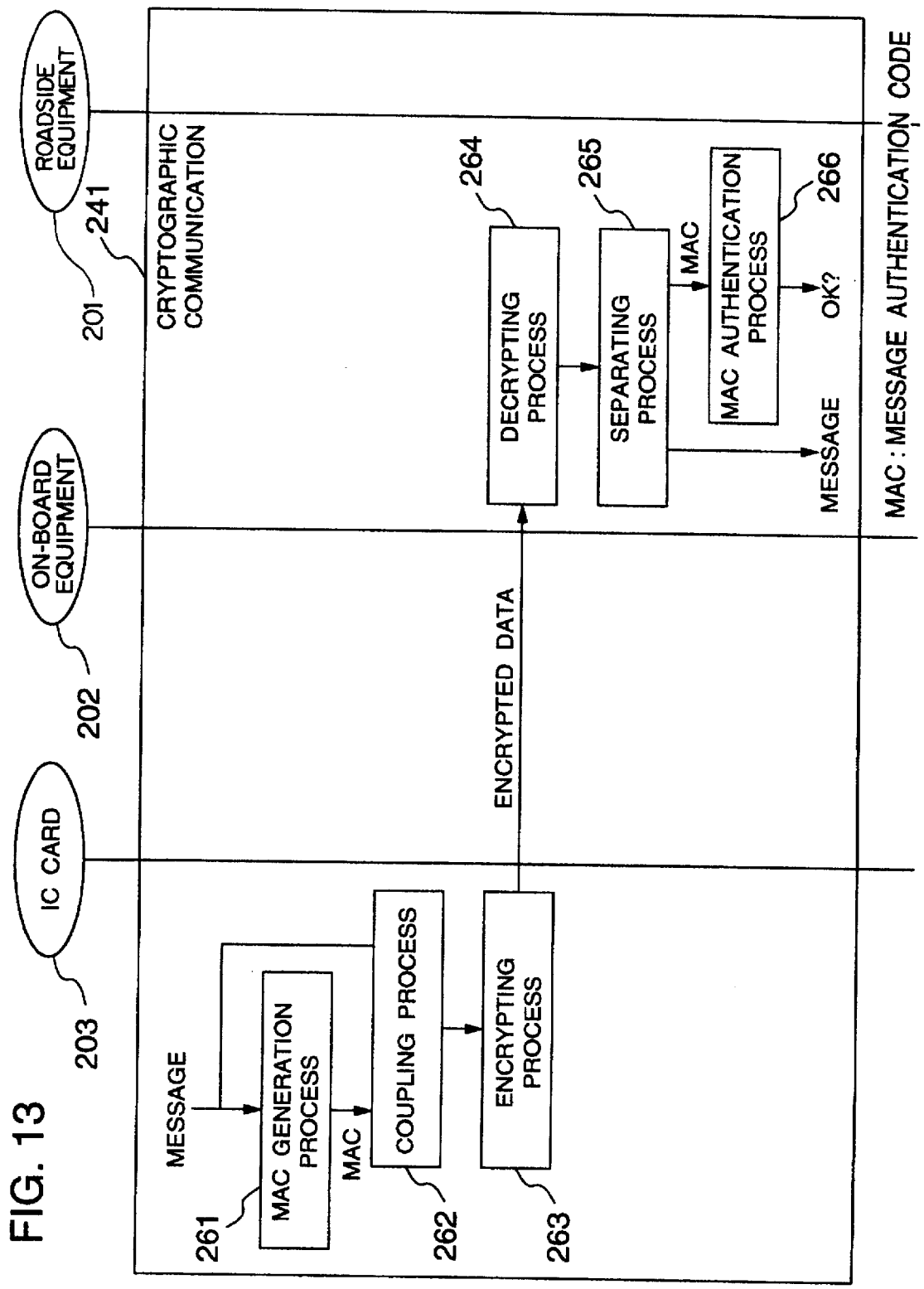
FIG. 13 is a chart illustrating cryptographic communication of the electronic toll collecting system.

FIG. 13 is a detailed flow chart illustrating the cryptographic communication 241 as an example of a cryptographic communication including message authentication. Referring to the flow chart shown in FIG. 13, first the IC card 203 generates a message authentication code at an MAC generation process 261. Next, the message to be transferred and the message authentication code are coupled at a coupling process 262. Thereafter, data containing the coupled message and message authentication code is encrypted at an encrypting process 263 to form encrypted data.

Next, upon reception of the encrypted data, the on-board equipment 202 decrypts the data at a decrypting process 264. Thereafter, at a separating process 265, the message and message authentication code transferred from the IC card are recovered. Next, the recovered message authentication code is verified at a MAC verifying process 266 in order to verify the correctness of the received message.

In the above manner, data not permitted to be altered or tapped, such as toll information and routing information, can be exchanged with security.

With the above processes, a road toll can be charged to the IC card 203 and the toll information can be managed at the road side equipment 201.

According to the present invention, it is possible to realize an encrypting conversion apparatus, a decrypting conversion apparatus, a cryptographic communication system and an electronic toll collection apparatus capable of changing algorithms of cryptographic conversion to hide the algorithm in use from a third party so that the apparatuses and system are resistant against a cryptographic attack and can operate at high speed.

What is claimed is:

1. An encrypting conversion apparatus for inputting at least one cipher key, at least one algorithm parameter which is independent of said cipher key, and plain text data and outputting cipher text data, said encrypting apparatus comprising:

a plurality stage of encrypting conversion means for executing each of an exclusive logical sum operation, a cyclic shift operation and an addition operation at least once, wherein:

said encrypting conversion means includes at least one of each of first to third operation means, said first operation means executes either an exclusive logical sum operation or an addition operation of input data and a portion of data generated from data of the cipher key, said second operation means executes either an exclusive logical sum operation or an addition operation of input data and a determined by a portion of said algorithm parameter, and said third operation means cyclically shifts input data by the number of bits determined dynamically based on a portion of said algorithm parameter; and conversions which use combinations of a plurality stage of consecutive encrypting conversion means optionally selected from all of said encrypting conversion means and use the same input data and the same algorithm parameter, are all different.

2. A decrypting conversion apparatus for inputting at least one cipher key, at least one an algorithm parameter which is independent of said cipher key, and cipher text data and outputting plain text data, the apparatus comprising:

a plurality stage of decrypting conversion means for executing each of an exclusive logical sum operation, a cyclic shift operation and an addition operation at least once, wherein:

said decrypting conversion means includes at least one of each of first to third operation means, said first operation means executes either an exclusive logical sum operation or an addition operation of input data and a portion of data generated from data of the cipher key, said second operation means executes either an exclusive logical sum operation or an addition operation of input data and a determined by a portion of said algorithm parameter, and said third operation means cyclically shifts input data by the number of bits determined dynamically based on a portion of said algorithm parameter; and conversions which use combinations of a plurality stage of consecutive decrypting conversion means optionally selected from all of said decrypting conversion means and use the same input data and the same algorithm parameter, are all different.

* * * * *